(12) United States Patent
Brach

(10) Patent No.: US 11,498,866 B2
(45) Date of Patent: Nov. 15, 2022

(54) DEVICE AND METHOD FOR REPAIRING DAMAGED SPOTS

(71) Applicant: Harald Brach, Wildpoldsried (DE)

(72) Inventor: Harald Brach, Wildpoldsried (DE)

(*) Notice: Subject to any disclaimer, the term of this patent is extended or adjusted under 35 U.S.C. 154(b) by 489 days.

(21) Appl. No.: 16/465,963

(22) PCT Filed: Nov. 30, 2017

(86) PCT No.: PCT/EP2017/081055
§ 371 (c)(1),
(2) Date: May 31, 2019

(87) PCT Pub. No.: WO2018/100100
PCT Pub. Date: Jun. 7, 2018

(65) Prior Publication Data
US 2019/0300423 A1    Oct. 3, 2019

(30) Foreign Application Priority Data

Dec. 2, 2016 (DE) .......................... 102016224075.7

(51) Int. Cl.
*C03C 17/00* (2006.01)
*C03C 17/32* (2006.01)
(Continued)

(52) U.S. Cl.
CPC .............. *C03C 17/002* (2013.01); *B05C 5/02* (2013.01); *B05C 7/02* (2013.01); *C03C 17/32* (2013.01); *B29C 73/025* (2013.01); *B29L 2031/3052* (2013.01); *B32B 17/10036* (2013.01); *B32B 17/10963* (2013.01)

(58) Field of Classification Search
None
See application file for complete search history.

(56) References Cited

U.S. PATENT DOCUMENTS 4,032,272 A    6/1977  Miller
4,047,863 A *  9/1977  McCluskey ........... B29C 73/025
                                                     425/13

(Continued)

FOREIGN PATENT DOCUMENTS

DE    69715434    5/2003
DE    60008282    12/2004
(Continued)

OTHER PUBLICATIONS

International Preliminary Report on Patentability received for PCT Patent Application No. PCT/EP2017/081055, dated Jun. 13, 2019, 15 pages. (8 pages of English Translation and 7 pages of Original Document).

(Continued)

*Primary Examiner* — Jethro M. Pence
(74) *Attorney, Agent, or Firm* — Womble Bond Dickinson (US) LLP

(57) ABSTRACT

Tue invention relates to a device and a method for repairing a damaged spot (201) of a surface, in particular a glass pane (200) or a windscreen of a motor vehicle. A control unit controls an impingement of pressure profiles, whereby a processing head (101) is secured to the glass pane (200) and a repair means is introduced into the damaged spot (201).

30 Claims, 9 Drawing Sheets

(51) Int. Cl.
  *B05C 5/02* (2006.01)
  *B05C 7/02* (2006.01)
  *B29C 73/02* (2006.01)
  *B29L 31/30* (2006.01)
  *B32B 17/10* (2006.01)

(56) References Cited

U.S. PATENT DOCUMENTS

| | | |
|---|---|---|
| 4,569,808 A | 2/1986 | Smali |
| 4,597,727 A | 7/1986 | Birkhauser |
| 4,820,148 A | 4/1989 | Anderson |
| 4,921,411 A * | 5/1990 | Ottenheimer ......... B29C 73/025 156/94 |
| 5,156,853 A | 10/1992 | Werner et al. |
| 5,591,460 A | 1/1997 | Wanstrath et al. |
| 9,688,031 B2 * | 6/2017 | Hauser .............. B32B 17/10963 |
| 2015/0239185 A1 | 8/2015 | Hauser |

FOREIGN PATENT DOCUMENTS

| | | |
|---|---|---|
| GB | 2358424 | 7/2001 |
| GB | 2518407 A | 3/2015 |
| JP | 07-137154 A | 5/1995 |
| JP | 09-103737 A | 4/1997 |
| JP | 2003-513874 A | 4/2003 |
| WO | WO-98/14325 | 4/1998 |
| WO | 2015/040073 A1 | 3/2015 |

OTHER PUBLICATIONS

"International Search Report for PCT Application No. PCT/EP2017/081055 dated Mar. 20, 2018", 6 pages.

Notice of Reasons for Refusal received for Japanese Patent Application No. 2019-529996, dated Jun. 15, 2021, 7 pages (4 pages of English Translation and 3 pages of Original Document).

Office Action received for European Patent Application No. 17818065.9, dated Jan. 18, 2022, 12 pages (6 pages of English Translation and 6 pages of Original Document).

Search Report received for German Patent Application No. 102016224075.7, dated Jun. 27, 2017, 21 pages (11 pages of English Translation and 10 pages of Original Document).

* cited by examiner

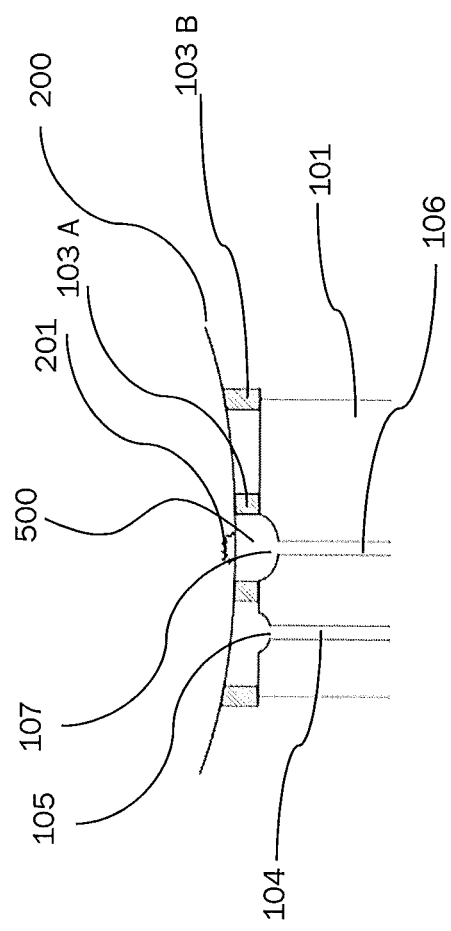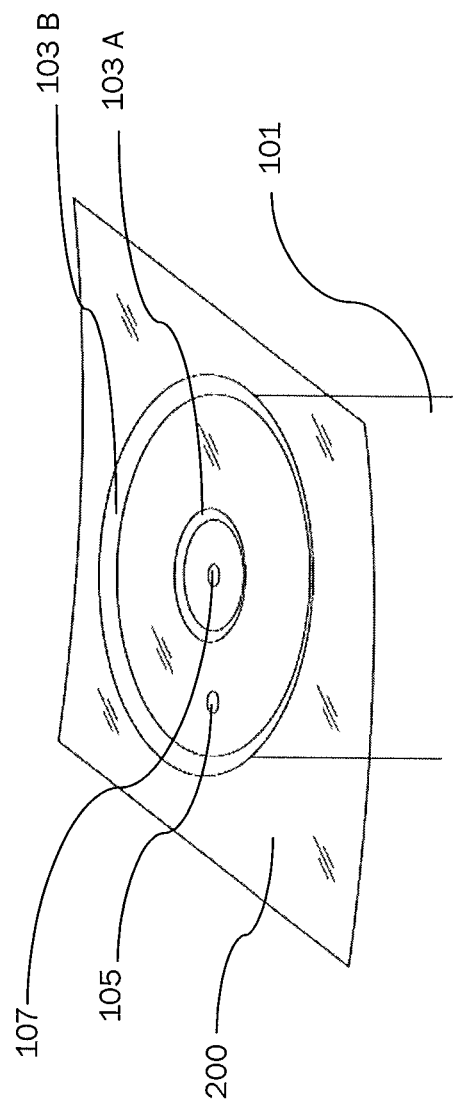

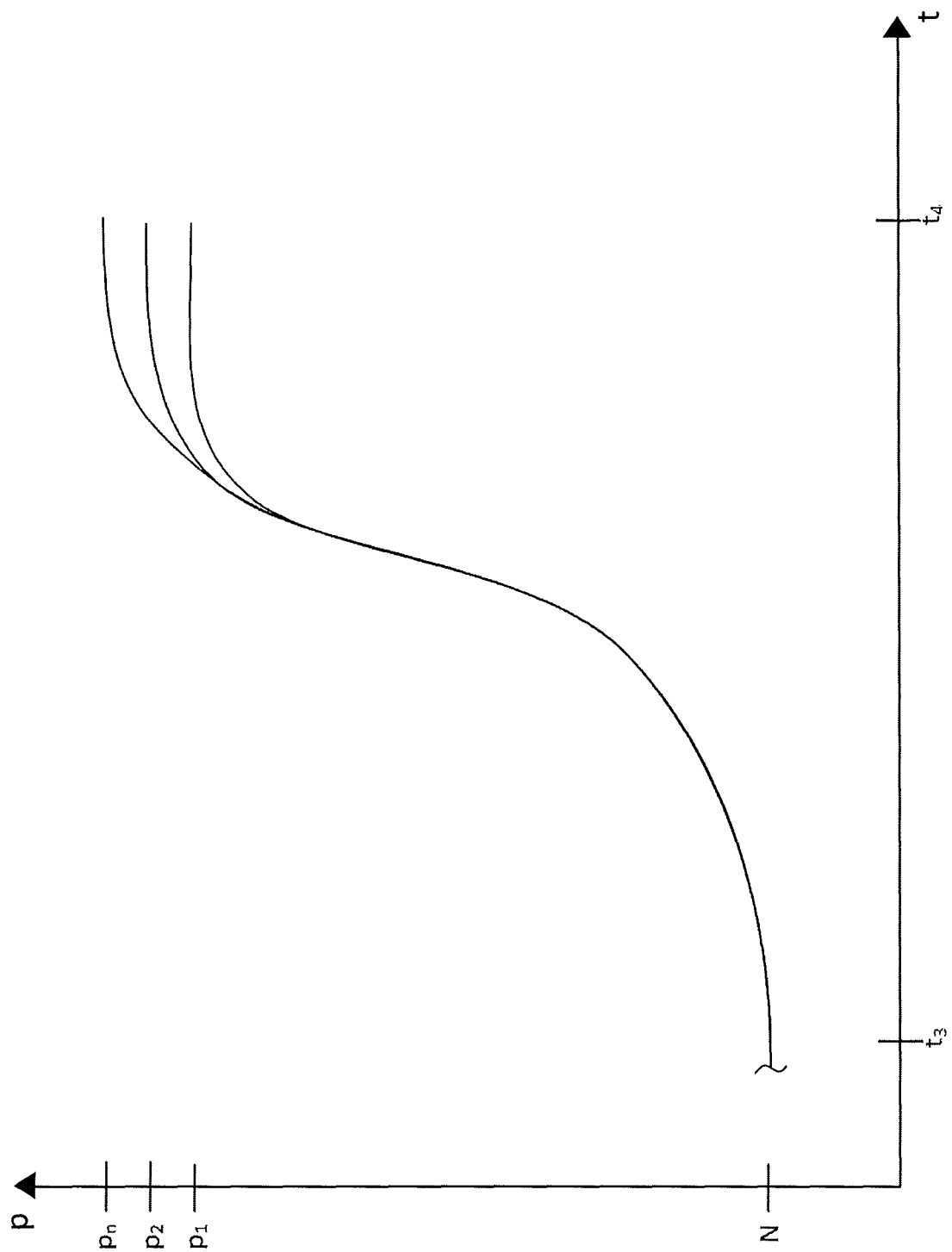

DEVICE AND METHOD FOR REPAIRING DAMAGED SPOTS

CROSS-REFERENCE TO RELATED APPLICATIONS

This application is the U.S. National Stage entry under 35 U.S.C. § 371 of international application PCT/EP2017/081055, filed 30 Nov. 2017, which in turn claims priority to German patent application DE 10 2016 224 075.7, filed 2 Dec. 2016.

FIELD OF THE INVENTION

This invention concerns a device and a method for repairing damaged spots in solid surfaces, and in particular in glass panes (windscreens of motor vehicles), in order to transport a repair means into a damaged spot at low cost and to repair the damaged spot in a time-efficient and high-precision manner.

BACKGROUND OF THE INVENTION

In the state of the art, devices and methods for repairing of damaged automotive glass are known in which a repair area is defined by placing a housing on a damaged spot, in which a negative pressure or positive pressure can be applied by means of a mechanically/manually operated piston. A repair means is then applied to the damaged spot by means of manual overpressure generation. Such a configuration has in particular the disadvantages that the applied pressures are not precisely adjustable and that furthermore, a position of the housing in relation to the damaged spot can be easily changed or moved due to the manual actuation of the piston. Displacement of the housing during the repair process may result in uneven distribution of the repair means, resulting in contamination of undamaged parts or surfaces of the glass pane.

SUMMARY OF THE INVENTION

Consequently, there is a need for a glass repair device or method for repairing glass, which makes it easier to repair a glass pane. In particular, there is a need to introduce or feed in a repair means with high precision into a damaged spot that has been cleaned of impurities, as well as to precisely adjust and guarantee the atmospheric parameters (pressure values) in the vicinity of the damaged spot which are necessary for a high-quality repair in coordination with the individual phases of a repair.

This problem is solved by the invention according to the independent claims. Further preferred embodiments of the invention are described in the dependent claims.

One aspect of the invention relates to a device for repairing a damaged spot in a glass pane which may have a processing head. The processing head can be configured such that it can be arranged on the glass pane. The processing head can also have a fixing section. This fixing section can be configured such that the processing head can be fixed to the glass pane. In addition, the processing head of the device according to the invention may have a repair section. The repair section can be configured so as to fill the damaged spot with a repair means. In addition, the processing head may have a first passage with an opening that may lead into the fixing section. The passage may further be configured so that a first pressure can be applied to the passage. In addition, the opening can be used to apply the first pressure between the glass pane and the fixing section. Furthermore, the processing head of the device according to the invention may have a second passage with an opening. The opening can lead to a repair section. In addition, the second passage can be configured so that the passage can be applied with an at least partially alternating pressure curve for a predetermined duration. In particular, by means of the opening between the damaged spot and the repair section the at least partially alternating pressure curve can be applied. Furthermore, the processing head can be configured so that a liquid repair means can be introduced into the second passage. The processing head can also be configured such that an introduced liquid repair means can be applied to the damaged spot of the glass pane and can fill the damaged spot if the second passage is applied with the at least partially alternating pressure curve for the predetermined duration.

The configuration of the device according to the invention for repairing a damaged spot of a glass pane makes it possible to repair a damaged glass pane more easily. In particular, a non-slip or fixing connection between the processing head and the glass pane is ensured, which, among other things, allows a precise introduction or transfer of a repair means to the damaged spot of the glass pane. In other words, the interaction of the pressurization ensures that, on the one hand, the processing head is fixed firmly to the glass pane or above the damaged spot during the entire repair and, on the other hand, the damaged spot is thoroughly cleaned of impurities, wherein the repair means can be introduced with high precision into all damaged areas of the damaged spot of the glass pane. In addition, it prevents the repair means from being applied or transferred to areas other than the damaged spot. The device according to the invention therefore prevents smearing or spreading of the repair means on undamaged areas of the glass pane or the solid surface.

Preferably, the device according to the invention for repairing a damaged spot of a glass pane is configured such that the predetermined duration can cover a first time interval. Furthermore, the predetermined duration may include a second time interval following the first time interval. Furthermore, the predetermined duration may include a third time interval following the second time interval. The device for repairing a damaged spot of a glass pane may further be configured such that during the first time interval the second passage is applied with the first pressure, wherein during the second time interval the second passage is applied with a second pressure and wherein during the third time interval the second passage is applied with a third pressure. Furthermore, the device can be configured to repair a damaged spot of a glass pane such that, after the third time interval has elapsed, the second passage is periodically alternately applied with the first pressure, the second pressure and the third pressure, respectively, until the end of the predetermined duration.

This embodiment has the advantage that the second passage can be applied with precisely specified pressure values according to a predetermined time curve, while the processing head can be securely fixed to the first passage of the glass pane by means of pressurization. Thus, it is allowed to clean the damaged spot thoroughly from impurities or soiling and to introduce the repair means exactly into the damaged spot of the glass pane, in particular into microscopic fractures or cracks. A repair process can thus be carried out more easily, faster and with a higher efficiency factor, i.e. higher quality.

Preferably, the device for repairing a damaged spot of a glass pane according to the invention is configured such that the fixing section can have a first sealing element, wherein the fixing section can be separated from the repair section by means of the first sealing element. In addition, the first sealing element can also be set up to adapt to a curve of the glass pane when it is disposed on the glass pane.

This embodiment has the advantage that the processing head of the device according to the invention can be used for glass panes with different degrees of curves or arching. In other words, it can be used with a wide range of glass panes from different manufacturers and models. The universal applicability of the present embodiment facilitates the repair process considerably and reduces material and cost expenditure.

In addition, a pressure applied between the glass pane and the repair section is reliably maintained. Suddenly occurring pressure gradients or pressure fluctuations can thus be well compensated due to the sealing element. In other words, the pressure value between the repair section and the glass pane is set to predetermined values with high precision and can be reliably maintained at a set value, which optimizes cleaning of the damaged spot or introduction of the repair means into or onto the damaged spot. As a result, the quality of the repair of the damaged spot can be improved.

Preferably, the device according to the invention for repairing a damaged spot in a glass pane is configured such that the first sealing element can be a ring made of a flexible material or comprises a flexible material.

This embodiment has the advantage that the sealing element easily adapts to any geometrical shape of the processing head. In addition, a flexible material enables an improved reaction behavior of the sealing element in the event of sudden pressure fluctuations. In other words, a flexible material allows the sealing element to yield to pressure fluctuations without losing sealing or insulation properties.

Preferably, the device for repairing a damaged spot of a glass pane according to the invention is configured such that the fixing section can have a second sealing element, wherein by means of the second sealing element the fixing section can be separated from an outer region of the processing head. In addition, the second sealing element can also be set up to adapt to a curve or arching of the glass pane when it is disposed on the glass pane.

This embodiment has the advantage that the processing head of the device according to the invention can be used for glass panes with different degrees of curves or arching. In other words, it can be used with a wide range of glass panes from different manufacturers and models. The universal applicability of this design facilitates the repair process considerably and reduces material or cost expenditure.

In addition, an applied pressure between the glass pane and the fixing section is reliably maintained in relation to an external atmosphere. Suddenly occurring pressure gradients or pressure fluctuations can thus be well compensated. In other words, the pressure value between the fixing section and the glass pane is sealed against an external atmosphere or pressure. Shifting or slipping of the processing head on the glass pane is thus suppressed and consequently, the fixation of the processing head on the glass pane is improved.

Preferably, the device for repairing a damaged spot of a glass pane according to the invention is configured such that the second sealing element can be a ring made of a flexible material or comprises a flexible material.

This embodiment has the advantage that the sealing element easily adapts to any geometrical shape of the processing head. In addition, the flexible material of the sealing element enables sudden pressure fluctuations to be absorbed. To be more precise, the material of the sealing element yields to a rapidly changing pressure gradient without the pressure insulation collapsing or being lost. The fixing properties of the processing head on a surface are thus improved.

Preferably, the device for repairing a damaged spot of a glass pane is configured such that the processing head can have a rotary element with a chamber which can contain the liquid repair means. Furthermore, the rotary element can be rotated relative to the processing head. The processing head can also be configured such that the chamber can be connected to the repair section by a third passage. In addition, the liquid repair means can be introduced into the repair section by rotating the rotary element relative to the processing head.

In particular, the rotary element with the chamber may be rotatably arranged on the processing head and configured such that the introduction of the liquid repair means is initiated by the action of gravity, in so far as the chamber filled with repair fluid is rotated to a position (passage position) allowing the repair means to flow out of the chamber and onto the repair section.

For this purpose, the liquid repair means can first be introduced into the chamber by means of a filling opening in the chamber, wherein after the chamber has been filled, uncontrolled leakage of the repair means from the filling opening in the chamber can be prevented by sealing or caulking the filling opening with a sealing element.

In particular, the chamber may be configured such that introduction of the liquid repair means into the repair section can be effected by a rotary movement of the rotary element and the chamber relative to the processing head to the passage position of the rotary element or chamber. As a result of the rotary movement of the rotating element or chamber to the passage position, the liquid repair means can flow out of the chamber under the influence of gravity and be transferred to the repair section. By means of a rotary movement of the rotary element and the chamber, which leads it out of the passage position, the introduction of the liquid repair means onto the repair section can be interrupted.

In other words, by means of mechanical adjustment of the rotary element and the chamber, it is possible to enable or control the introduction of the liquid repair means in the chamber to the repair section by gravity.

This embodiment has the advantage that the treatment of the damaged spot with the repair means is facilitated. In particular, it is enabled to control the timing of the introduction of the repair means to the damaged spot more precisely. Thus, the repair process is facilitated.

Preferably, the device for repairing a damaged spot of a glass pane according to the invention is configured such that the liquid repair means can comprise at least one of an acrylic resin, a polyester resin, an epoxy resin or a UV-curing one-component adhesive.

This embodiment has the advantage that repairing can be carried out economically, i.e. quickly. In addition, simple post-processing, such as grinding and/or polishing, of the damaged spot is enabled.

Furthermore, the transmission coefficient for visible light, that is electromagnetic radiation of a frequency range from approx. 380 nm to 780 nm, corresponds to the transmission coefficient for visible light of the undamaged glass pane or the glass surface. In other words, after the repair of the damaged spot, light can propagate through the damaged spot without disturbing optical effects.

Preferably, the device for repairing a damaged spot in a glass pane according to the invention is configured in such a way that the first pressure can be lower than an atmospheric pressure. In addition, the first pressure can have a value between $0.5*10^5$ Pa and $0.95*10^5$ Pa. In other words, the first pressure can have a value from a value interval ranging from $0.5*10^5$ Pa to $0.95*10^5$ Pa.

This has the advantage that the first pressure can be set precisely to a value below the atmospheric pressure. In other words, a provision or application of a negative pressure can be guaranteed at the first or second passage. By application a negative pressure to the first passage, the processing head can be securely arranged or fixed to the glass pane. The application with a negative pressure to the second passage allows to clean the damaged spot of the glass pane from impurities and to prevent the formation of air inclusions (air bubbles) during the introduction of the repair means onto or into the damaged spot of the glass pane. As a result, the grade or quality of the repair of the damaged spot can be improved.

Preferably, the device for repairing a damaged spot in a glass pane according to the invention is configured such that the second pressure can be an atmospheric normal pressure.

This has the advantage that in the presence of an atmospheric normal pressure at the second passage, the repair means can penetrate into fine cracks in the damaged spot by means of capillarity or the capillary effect. Capillarity is the behavior of liquids that they exhibit in solids upon contact with capillaries, e.g. narrow tubes, cracks, or cavities. These effects are caused by the surface tension of liquids themselves and the interfacial tension between liquids and a solid surface. The liquid repair means wets the material, for example, a fine crack, of the damaged spot and a capillary ascension occurs. The liquid (repair means) penetrates into a cavity or fine crack of the damaged spot and forms a concave surface. This behavior is due to the adhesive force. Adhesion or attachment force refers to the physical state of an interface layer which forms between two condensed phases coming into contact, i.e. between solids (here glass pane or damaged areas of the glass pane) and liquids (here repair means) with negligible vapor pressure. The main property of this state is the mechanical cohesion of the phases involved caused by molecular interactions in the interface layer. This means that mechanical cohesion is achieved in the interface layer between the repair means and the glass material of the glass pane or the damaged spot of the glass pane. Thus, the repair liquid penetrates also into very fine cracks of the damaged spot.

Preferably, the device for repairing a damaged spot of a glass pane according to the invention is configured such that the third pressure can be greater than an atmospheric pressure. In particular, the third pressure may have a value between 3.2 and $4.2*10^5$ Pa. In other words, the third pressure can have a value from a value interval ranging from 3.2 to $4.2*10^5$ Pa.

This has the advantage that in relation to an atmospheric normal pressure (atmospheric pressure), the third pressure corresponds to an overpressure. As a result, the repair means can completely fill the damaged spot or the cracks in the damaged spot. To be more precise, the application of an overpressure ensures that the remaining cavities between the repair means and the damaged spot are filled with repair means by transferring the repair means by means of overpressure into the remaining cavities of the damaged spot. This increases the grade or quality of the repair.

Preferably, the device for repairing a damaged spot of a glass pane according to the invention is configured such that the first pressure can be generated by a first pump element. Furthermore, the first pressure can be applied to the first passage by means of a first pressure connection which can be arranged between the first pump element and the first passage.

This has the advantage that the first pressure can be generated or maintained constantly and continuously by means of the first pump element and can be passed on directly to or applied to the first passage via or by means of the first pressure connection. As a result, reliable application of the first pressure to the first passage is possible, which ensures that the processing head is fixed to the glass pane and thus facilitates the repair process.

Preferably, the device for repairing a damaged spot of a glass pane according to the invention is configured such that the device can comprise a control unit. In addition, the control unit may be configured to continuously apply the first pressure to the first passage in response to activation of the control unit and to automatically apply the first, second, and third pressures alternately to the second passage from the start of the predetermined duration until the end of the predetermined duration.

This has the advantage that the processing head is securely fixed to the glass pane or above the damaged spot of the glass pane by applying pressure to the first passage with the first pressure over the entire duration of the repair. This prevents the processing head from slipping during repair. In addition, an automatic alternating application of the first, second, and third pressure to the second passage over the predetermined duration allows the repair process to be facilitated. In particular, the automation of pressurization enables the repair process to be carried out continuously without interruption. This eliminates sources of error that may result from manual pressurization, such as incorrect introduction of the repair means or undesired displacement of the processing head.

Furthermore, due to the automatic alternating pressurization over a predetermined duration, allows that the repair means completely fills the damaged spot or cracks in the damaged spot. In particular, due to the alternation of the pressure values, i.e. the alternation between first, second, and third pressures, it is possible that, when a negative pressure is applied, in particular, air inclusions are removed from the damaged spot or the cracks in the damaged spot, when a normal atmospheric pressure is applied, the repair means is introduced into the cracks in the damaged spot by means of the capillary effect, and when a positive pressure is applied, the repair means is pushed or pressed further into the cracks in the damaged spot and thus fills the remaining cavities in the damaged spot or the cracks in the damaged spot. This effect is optimized by alternating between the first, second, and third pressure values. This considerably improves the grade or quality of the repair of the damaged spot.

Preferably, the device for repairing a damaged spot of a glass pane according to the invention is configured such that the second and third pressure can be generated by a second pump element. In addition, a second pressure connection can be connected to the second passage by means of a pressure connection and have a switching element. The switching element can be connected to the first pump element by means of a third pressure connection. Furthermore, the switching element can be connected to the second pump element by means of a fourth pressure connection. The switching element may also be configured to provide a pressure-tight connection between the first pump element and the second pressure connection or between the second pump element and the second pressure connection in response to control by the control unit. The second pressure connection can also be used to apply the first, second or third pressure to the second passage.

This has the advantage that the second and third pressure can be generated or maintained constantly and continuously by means of the second pump element and can be passed on or applied directly to the second passage via or by means of the second pressure connection and the switching element. As a result, reliable application of the second pressure to the second passage is possible, which increases the quality of the repair process and enables simplification of the repair process.

Preferably, the device for repairing a damaged spot of a glass pane according to the invention is configured such that the fourth pressure connection may include a pressure relief valve, and the pressure relief valve may be configured to set a constant maximum third pressure.

This has the advantage that a predetermined maximum third pressure at the second passage is not exceeded. In other words, the pressure relief valve prevents this pressure from being transferred to the second passage when a pressure (overpressure) is generated that exceeds a threshold value, i.e. the maximum third pressure. As a result, it can be prevented that an excessively high pressure between the damaged spot and the repair section is built up or applied and leads to a detachment or slippage of the processing head during the repair process. Thus, an additional simplification of the repair process is guaranteed and the safety of the operation during the repair is increased.

Preferably, the device for repairing a damaged spot of a glass pane according to the invention is configured such that the first pressure connection can have a back-pressure valve. The back-pressure valve may be arranged to maintain the first pressure in the first pressure connection at the first passage for a predetermined period of time without continuous pressure from the pump element.

This has the advantage that even without a permanent or continuous supply or pressure generation of the first pressure by the first pump element, the first pressure is applied or maintained at the first passage and thus the processing head remains arranged or fixed at the glass pane or above the damaged spot of the glass pane for the duration of the repair process.

Preferably, the device for repairing a damaged spot of a glass pane according to the invention is configured such that, in response to control by a control unit, the second pressure and the third pressure can be generated by the first pump element. In addition, the first pressure passage can include a switching element. The switching element can be arranged between the first pump element and the first passage of the processing head. In addition, the first pressure passage may include a back-pressure valve. The back-pressure valve can be arranged between the switching element and the second passage. Further, the back-pressure valve may be arranged to maintain the first pressure in the first pressure connection and the first passage for a predetermined period of time even without continuous pressurization with the first pressure by the first pump element. The second passage of the processing head can be connected in a pressure-tight manner to the switching element by means of a second pressure passage.

In addition, the switching element may be configured to provide a pressure-tight connection between the first pump element and the second pressure connection in response to control by the control unit. Further, the control unit may be configured, after establishing the pressure-tight connection between the first pump element and the second pressure connection, to apply the respective first pressure, second pressure, and third pressure to the second passage by means of the second pressure connection.

This has the advantage that it is allowed to generate all pressure curves, i.e. in particular the first, second, and third pressure, with only one pump element. This facilitates the assembly of the device and reduces costs and material costs.

Preferably, the device for repairing a damaged spot of a glass pane according to the invention is configured such that the processing head can be in the form of an ellipse or oval.

In particular, this has the advantage that the processing head can adapt better to the curve of the glass pane, which further increases the adhesion or fixation of the processing head to the glass pane during the processing.

Another aspect of the invention relates to a method for repairing a damaged spot of a glass pane. The method for repairing a damaged spot of a glass pane may include the recording of an initial input by a control unit. In addition, the method according to the invention may include the arrangement of a processing head at the damaged spot of the glass pane. In addition, the method according to the invention may include the recording of a second input by the control unit. Further, the method may include performing the step of applying a first pressure between the glass pane and a fixing section of the processing head, whereby the processing head is fixed to the glass pane. Furthermore, the method may include performing the step of introducing a liquid repair means into the second passage and transferring the liquid repair means to the damaged spot of the glass pane. In addition, the method may include performing the step of applying an at least partially alternating pressure curve between the damaged spot and a repair section of the processing head for a predetermined duration.

The configuration of the method for repairing a damaged spot of a glass pane allows to repair a damaged glass pane more easily. An automated repair process is provided, which facilitates the repair of a damaged spot of a glass pane. In particular, it allows the processing head to be mounted or arranged only at the damaged spot of the glass pane so that the repair process can be controlled automatically by the control unit, i.e. without external intervention. Specifically, fixing the processing head to the glass pane, introducing the liquid repair means into the damaged spot, and applying an alternating pressure between the damaged spot and the repair section, is automatically controlled or initiated by the control unit after the control unit has received inputs indicative of the start of the repair process. As a result, it is possible to have the repair process carried out independently or unattended by the control unit. Thus, the efficiency and productivity of a glass pane repair is increased by the method according to the invention.

Preferably, the method for repairing a damaged spot of a glass pane according to the invention is set up such that the predetermined duration can include a first time interval. Furthermore, the predetermined duration may include a second time interval following the first time interval. Furthermore, the predetermined duration may include a third time interval following the second time interval. Applying the at least partially alternating pressure curve may also include the step of applying the first pressure during the first time interval between the damaged spot and the repair section of the processing head, whereby the damaged spot can be cleaned of impurities. In addition, applying the at least partially alternating pressure curve may include the step of applying a second pressure during the second time interval between the damaged spot and the repair section of the processing head. Further, applying the at least partially alternating pressure curve may include the step of applying a third pressure during the third time interval between the damaged spot and the repair section of the processing head, whereby the liquid repair means can reliably fill the damaged spot of the glass pane. Further, applying the at least partially alternating pressure curve may include the step of periodically alternating application of the first pressure, the second pressure, and the third pressure to the second passage until the end of the predetermined duration after the third time interval has elapsed.

This has the advantage that during the repair process, the damaged spot of the glass pane can be applied with precisely specified pressure values by means of the second passage, which ensures thorough cleaning of the damaged spot and precise introduction of the repair means into the damaged spot, while the processing head can be securely fixed to the glass pane with a precise pressure value (negative pressure) due to the continuous pressurization. This enables a more efficient or accelerated repair process in connection with an improved quality of the repair result, i.e. the repaired damaged spot of the glass pane.

Preferably, the method of repairing a damaged spot of a glass pane according to the invention is set up such that it can further include the step of removing the processing head from the glass pane after the predetermined duration has elapsed. In addition, the method according to the invention may include the step of irradiating the damaged spot with light from a light source, causing or at least accelerating curing of the liquid repair means.

This has the advantage that a finishing process (for example cleaning of the glass pane) can be carried out promptly. The repair process is thus further accelerated and made more efficient.

Preferably, the method for repairing a damaged spot of a glass pane according to the invention is set up such that it can also include the step of processing the damaged spot. The processing of the damaged spot may include at least grinding, cleaning, waxing and polishing.

This has the advantage that the quality of the repaired damaged spot is increased.

In summary, the invention allows that a repair of a damaged spot of a glass pane or other surfaces can be carried out in a universal manner. In addition, the degree of quality or the grade of the repair of the damaged spot is increased in comparison to previous systems.

BRIEF DESCRIPTION OF THE DRAWINGS

The invention is described in the following exemplarily with reference to the attached schematic drawings. Therein FIG. 2 shows a schematic cross-sectional view of a processing head of a device for repairing damaged spots mounted on a glass pane or surface, FIG. 3 shows an enlarged perspective view of a processing head arranged on a glass pane, FIG. 9 shows a pressure rise phase.

DETAILED DESCRIPTION

In the following, various examples of the present invention are described in detail with reference to the Figures. Same or similar elements in the Figures are designated with the same reference signs. However, the present invention is not limited to the described configuration features, but further includes modifications of features of the described examples and combinations of features of different examples within the scope of protection of the independent claims.

Figure 1:
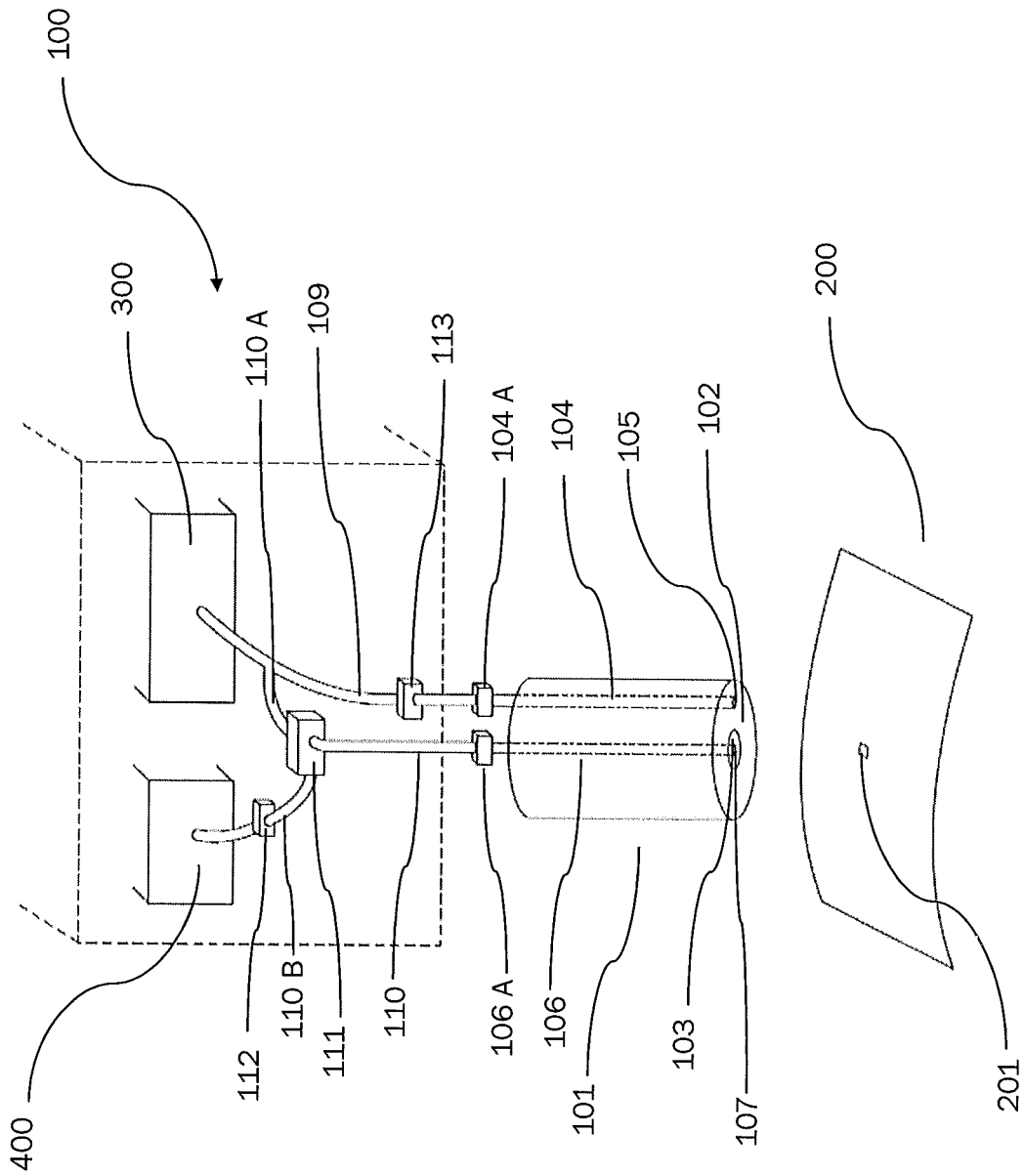
FIG. 1 shows a perspective view of an exemplary configuration of a device for repairing damaged spots of a glass pane or other surfaces, including two pump elements.

FIG. 1 shows a perspective view of an exemplary configuration of a device for repairing a damaged spot of a glass pane according to the invention. A processing head 101 is configured to be disposed on or above a damaged spot 201 of a glass pane 200. In particular, the processing head 101 comprises a fixing section 102 configured to fix the processing head 101 to the glass pane 200 or above the damaged spot 201 of the glass pane 200, respectively. Further, the processing head 101 comprises a repair section 103 configured to introduce a liquid repair means into the damaged spot 201 of the glass pane 200 after disposal of the processing head 101 on the glass pane 200. The repair section 103 and fixing section 102 are arranged on one side of the processing head 101 facing the damaged spot 201 of the glass pane 200 for repair. In addition, FIG. 1 shows that the processing head 101 has a first passage 104 extending inside the processing head 101 and leading into the fixing section 102 in a first opening 105. It is further shown that the processing head 101 has a second passage 106 which extends spatially separated from the first passage 104 inside the processing head 101 and leads into a second opening 107 in the repair section 103. The repair section 103 is spatially separated or delimited from the fixing section 102 by means of a first elastic sealing element 103 A (see also FIG. 7B). Analogously, the fixing section 102 has a second elastic sealing element 103 B (see also FIG. 7B), whereby the fixing section 102 is delimited outwardly or laterally with respect to an outer area of the processing head 101. The geometrical shape of the processing head 101 in a cutting plane orthogonally to the longitudinal axis of the processing head is elliptical. Among other things, this has the advantage that, on the one hand, the feel of the processing head 101 is improved, i.e. it is easier to grasp the processing head 101, and, on the other hand, the processing head 101 can be better adapted to a curve of the glass pane 200.

The total area (surface) of the fixing section 102, moreover, is larger than the total area of the repair section 103, which is of particular importance when the processing head 101 is arranged on the glass pane 200 and is fixed to the glass pane 200 with a negative pressure by applying pressure to the area between the glass pane 200 and the fixing section 102, and at the same time an overpressure is applied to the area between the repair section 103 and the glass pane 200 or damaged spot 201. A pressure (p) indicates a relationship between a vectorial surface element $d\vec{A}$ and a normal force $d\vec{F}_n$ acting on said element and is thus the constant of proportionality between these two vectors:

$$d\vec{F}_n = da\vec{A} = p\vec{n}dA.$$

Here, the normal vector points to the surface in the same direction as the force.

Consequently, the total force is the integrated normal force. The force which presses the processing head 101 against the glass pane 200 results from the interaction between the atmospheric pressure surrounding the processing head 101 and the negative pressure applied between the glass pane 200 and the fixing section 102. In other words, due to the negative pressure between the glass pane 200 and the fixing section 102, a pressing force acts which presses the processing head 101 against the glass pane 200 and which results from the external atmospheric pressure surrounding the processing head 101. This pressure force corresponds to the surface of the fixing section 102. If an overpressure is applied between the glass pane 200 or the damaged spot 201 and the repair section 103, this results in a force (repulsion force) which corresponds to the surface of the repair section 103 and is directed against the pressure force. Thus, the amount of pressure force and repulsion force depends on the area of the fixing section 102 and the area of the repair section 103. As a result, the area of the fixing section 102 is selected to be larger than the area of the repair section 103 to prevent detachment of the processing head from the glass pane 200 when overpressure is applied between the glass pane 200 and the repair section 103.

In addition, FIG. 1 shows that the first passage 104 can be connected to a first pressure connection by means of a first connecting element 104 A in a pressure-tight manner. The first connecting element 104 A can have a screw cap or clip cap, for example.

Analogously, it is shown that the second passage 106 can be connected to a second pressure connection 110 by means of a second connecting element 106 A in a pressure-tight manner. After establishing the pressure-tight connection between the second passage 106 of the second pressure connection 110 by means of the second connecting element 106 A, the second passage 106 can then be applied with a pressure profile or pressure curve.

Furthermore, FIG. 1 shows a back-pressure valve 113 which is arranged between the first connecting element 104 A and a first pump element 300 at the first pressure connection 109. This back-pressure valve 113 is configured to maintain an applied pressure at the first passage 104 for a predetermined period of time which may correspond at least to the duration of the repair process. In other words, the back-pressure valve 113 allows the processing head to be fixed without the need for continuous pressurization (negative pressure) by the first pump element 300 throughout the repair process.

The first pressure connection 109 is connected in a pressure-tight manner to the first pump element 300. Thus, a pressure (negative pressure) generated by the pump element 300 can be conducted directly to the first passage 104 by means of the pressure connection 109, if a pressure-tight connection is established between the first passage 104 and the first pressure connection 109 by means of the first connection element 104 A. As a result, with the processing head 101 arranged, the pressure generated by the pump element 300 between the glass pane 200 and the fixing section 102 is applied to the glass pane 200 or above the damaged spot 201, respectively, and the processing head 101 is non-slip fixed to the glass pane 200 due to the pressure gradient between the applied negative pressure and the atmospheric pressure surrounding the processing head 101.

Furthermore, FIG. 1 shows that a switching element 111 is arranged between the second connecting element 106 A and a second pump element 400 at the second pressure connection 110. A third pressure connection 110 A branches off from switching element 111 and is connected to the first pressure connection 109 in a pressure-tight manner. Furthermore, a fourth pressure connection 110 B branches off from the switching element 111, which is connected to the second pump element 400 in a pressure-tight manner. Between the switching element 111 and the second pump element 400, a pressure relief valve 112 is also arranged at the fourth pressure connection 110 B. The pressure relief valve 112 is located between the switching element 111 and the second pump element 400.

A control unit (not shown) controls the first pump element 300 and the second pump element 400 to generate predetermined pressure profiles, respectively. In particular, the first pump element 300 can be configured by means of the control unit to generate a negative pressure. This negative pressure is applied by means of the first pressure connection 109 and the first passage 104 between the glass pane 200 and the fixing section 102 with the processing head 101 arranged on the glass pane 200. This results in a non-slip attachment of the processing head 101 to the glass pane 200.

Furthermore, the control unit may control the switching element 111 to pass the negative pressure generated by the pump element 300 to the second passage 106 by the third pressure connection 110 A via the second pressure connection 110 so that a negative pressure is applied between the damaged spot 201 and the repair section 103. This can lead, for example, to a cleaning of the damaged spot from impurities such as fine dust particles.

The control unit also causes or controls the second pump element 400 to generate a pressure curve. In particular, in accordance with the generation of a negative pressure at the first pump element 300, a normal pressure, i.e. atmospheric pressure or an overpressure, is generated by the second pump element 400 in each case (the definition of overpressure and negative pressure refers to the normal atmospheric pressure in each case). Normal pressure can also be generated, if the second pump element 400 is not activated or switched off and/or is connected via another valve, for example, the second pressure connection 110 to the environment. The control unit controls the application of a pressure profile to the second passage 106 by means of the control element 111. In particular, the control unit controls that the pressure-tight connection with the first pump element 300 is interrupted after a predetermined period of time has elapsed. This means that no more negative pressure is applied to the second passage 106. Instead, by means of the control unit, the switching element 111 is configured to establish a pressure-tight connection between the second pump element 400 and the second passage 106 by means of the fourth pressure connection 110 B.

The second pump element 400 is then configured by the control unit to generate a normal pressure which is applied at the second passage 106. As already mentioned above, this can be done, for example, by switching off the second pump element 400. However, it is also possible, for example, to connect the second pressure connection to the environment (see above). This enables a repair means introduced into the second passage 106 to penetrate cracks and hollows in the damaged spot 201 by means of the capillary effect. After a predetermined period of time has elapsed, the control element controls the second pump element 400 to generate an overpressure curve. This generated overpressure is then applied by means of the fourth pressure connection 110 B from the pump element 400 via the switching element 111, the second pressure connection 110, and the second passage 106 of the processing head 101 between the damaged spot 201 and the repair section 103. As a result, the repair means is pressed or introduced into any remaining cavities or hollows in the damaged spot 201.

The overpressure valve 112 has a protective function here. In the event that the second pump element 400 generates a pressure curve exceeding a predetermined maximum threshold, the pressure relief valve 112 prevents this excessive pressure from being transmitted to the second passage 106. Thus, at most a predetermined maximum pressure is applied to the second passage 106. Among other things, this plays an important role for the attachment of the processing head 101 to the glass pane 200, since excessive overpressure between the damaged spot 201 or the glass pane 200 and the repair section 103 could result in the processing head 101 being detached from the glass pane 200. Such unintentional detachment of the processing head 101 from the glass pane 200 due to excessive overpressure is thus prevented by the pressure relief valve 112.

After a predetermined period of time has elapsed, the switching element 111 is switched by the control unit to interrupt the pressure-tight connection between the second pump element 400 and the switching element 111 and, instead, to re-establish a pressure-tight connection between the first pump element 300 and the switching element 111 by means of the third pressure connection 110 A. The switching element 111 is switched by the control unit to interrupt the pressure-tight connection between the second pump element 400 and the switching element 111. Thus, a negative pressure is applied between the damaged spot 201 and the repair section 103, as a result of which e.g. an air bubble inclusion can be removed. In other words, the negative pressure applied between the damaged spot 201 and the repair section 103 may cause potential air bubble inclusions in the repair means to escape.

The control unit is configured to alternate between negative pressure, normal atmospheric pressure and positive pressure according to predetermined time intervals by controlling the switching element 111 and in particular the second pump element 400 alternately, i.e. periodically alternately, over a predetermined period of time. The pressure change can be discontinuous or continuous. In other words, it is possible to let the pressure transitions run smoothly or suddenly, i.e. discontinuously.

After the predetermined time has elapsed, the control unit causes the pressurization of the first passage 104 and the second passage 106 to terminate.

Furthermore, FIG. 1 schematically shows that the complete construction of the device excluding the processing head 101, the connecting elements 104 A, 106 A, and parts of the first pressure connection 109 and the second pressure connection 110 can be included in a housing 100.

FIG. 2 shows a schematic cross-sectional view of a processing head 101 of a device for repairing damaged spots mounted on a glass pane 200 or surface. The sectional area of the cross-section shown here runs parallel to the longitudinal axis of the processing head 101. In particular, FIG. 2 shows the first sealing element 103 A and the second sealing element 103 B. The first sealing element 103 A separates the repair section 103 from the fixing section 102 of the processing head 101. As a result, upon contacting the first sealing element 103 A with the surface of the glass pane 200, an air-tight seal is produced so that the volume comprising the damaged spot 201, the repair section 103, and the second passage 106 can be applied with pressure. The area between the glass pane 200, the sealing element 103A, and the second opening 107 represents a processing point 500. Analogously, the second sealing element 103 B, when contacted with the glass pane 200, delimits the volume comprising the space between the fixing section 102 and the glass pane 200 and the first passage 104 from the external atmosphere. This sealing to the outside allows a pressure profile to be reliably applied between the fixing section 102 and the glass pane 200. The sealing elements 103 A, 103 B are made of an elastic or flexible material and can therefore adapt to changes in position or inclination of the processing head 101 on the glass pane 200 and reliably maintain a seal for pressurization. Furthermore, the elastic properties of the sealing elements 103 A, 103 B support the fact that the processing head can be used for a large number of surface geometries. In other words, the device for repairing a glass pane is universally applicable, i.e. it can be used unchanged for glass panes (e.g. motor vehicle windscreens) of different models and different manufacturers.

FIG. 3 shows a magnified schematic perspective view of a processing head 101 arranged on a glass pane 200 from below or through the glass pane 200. In particular, the elliptical geometry of the processing head 101 is shown. This geometric configuration allows an improved adaptation of the processing head 101 to the curve of glass panes 200. As a result, the adhesion or fixation of the processing head 101 is considerably improved during the repair process of the damaged spot 201.

Further, the elastic sealing elements 103 A, 103 B, which can also be ring-shaped or ellipsoidal, can be seen in FIG. 3. It is also possible to configure the elastic sealing elements 103 A, 103 B in lamellar form. In combination with the elliptical geometry of the processing head 101, the positioning or fixing of the processing head 101 on different glass panes of different geometry is improved. Further, the second opening 107 of the second passage 106 in the repair section 103, and the first opening 105 of the first passage 104 in the fixing section 102, are shown, whereby when the processing head 101 is arranged on a glass pane 200, pressurization is enabled between the fixing section 102 and the glass pane 200 and the repair section 103 and the glass pane 200, respectively. In addition, a repair means is transferred by means of the second opening 107 to the damaged spot 201.

Figure 4:
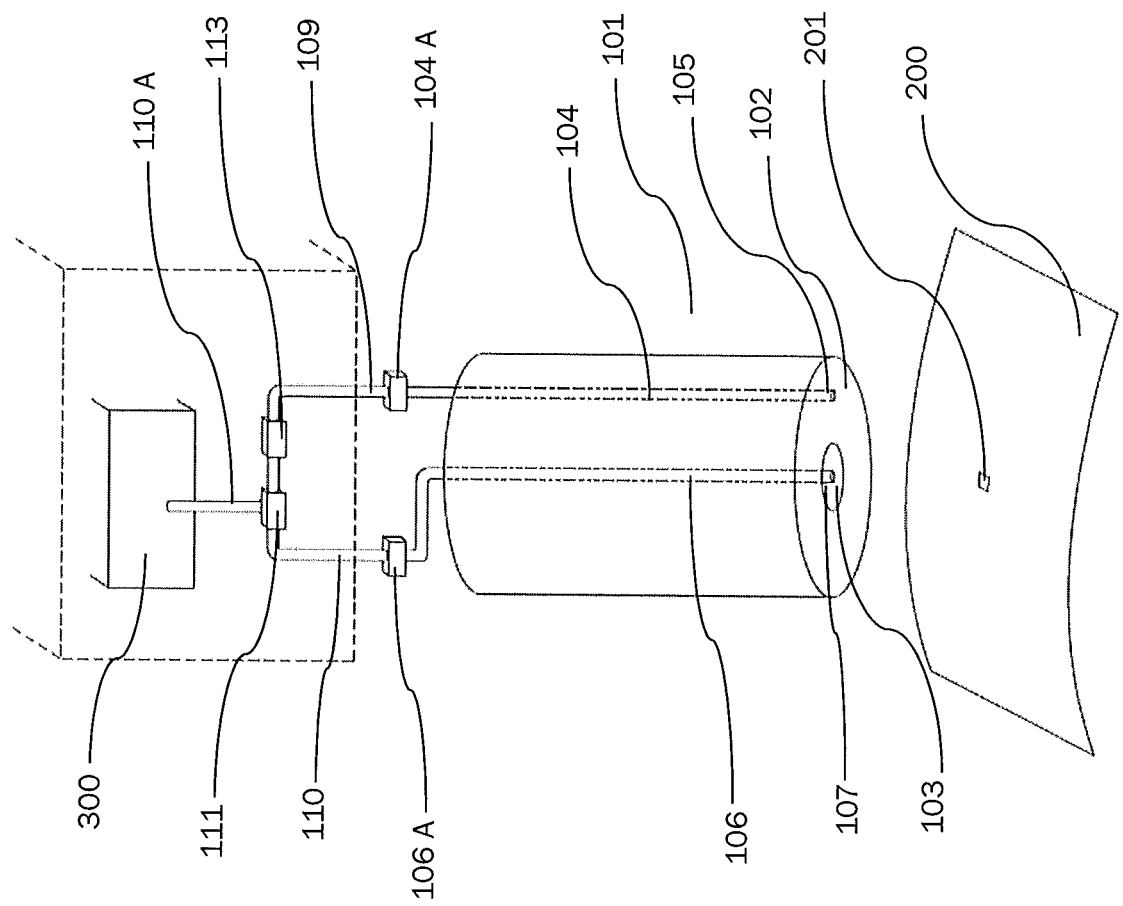
FIG. 4 shows a perspective view of a further exemplary configuration of a device for repairing damaged spots of a glass pane or other surfaces, including only a pump element.

FIG. 4 shows a perspective view of another exemplary configuration of a device for repairing damaged spots of a glass pane, which only comprises a pump element.

FIG. 4 shows in particular a (first) pump element 300 which is connected in a pressure-tight manner to a control element 111 by means of the pressure connection 110 A. The control element 111 is also connected to a first pressure connection 109 and a second pressure connection 110 in a pressure-tight manner. Furthermore, a back-pressure valve 113 is shown which is arranged at the pressure connection 109 between the switching element 111 and a connecting element 104 A. The features relating to the processing head 101 and the connecting elements 104 A and 106 A correspond analogously to the features described in FIG. 1, and therefore reference is made to FIG. 1 for a detailed description. In addition, a pressure relief valve 112 (not shown) can be arranged between the pump element 300 and the control element 111 to prevent a pressure value between the damaged spot 201 and the repair section 103 being applied, which would cause the processing head 101 to detach from the glass pane 200 during repair.

A control unit (not shown) controls the generation of a pressure profile by the pump element 300. After placing the processing head 101 on the glass pane 200 and filling a repair means into the second passage 106 of the processing head 101, the control unit controls the pump element 300 to generate a negative pressure. Furthermore, the control element 111 is controlled by the control unit to establish a pressure-tight connection between the pump element 300, by means of the pressure connection 110 A, and the pressure connection 109, as well as the pressure connection 110. As a result, a negative pressure is applied between the glass pane 200 and the fixing section 102, as well as between the damaged spot 201 and the repair section 103. Thus, the processing head 101 is fixed firmly to the glass pane 200, and the damaged spot 201 is cleaned, e.g. from impurities. After a predetermined period of time has elapsed, the control unit configures the control element 111 to interrupt the pressure-tight connection between the first pressure connection 109 and the pump element 300. However, by means of the back-pressure valve 113 the prevailing pressure value, i.e. a negative pressure, between the glass pane 200 and the fixing section 102 is maintained. As a result, the processing head 101 remains fixed to the glass pane 200. Accordingly, the control element 111 is instructed or controlled by the control unit to maintain the pressure-tight connection between the pump element 300 and the second pressure curve 110. The pump element 300 is then instructed by the control unit to generate an atmospheric normal pressure. By means of the pressure-tight connection between the pump element 300 and the second passage 106 of the processing head 101, an atmospheric normal pressure is applied between the damaged spot 201 of the glass pane 200 and the repair section 103. As a result, cavities or cracks in the damaged spot 201 of the glass pane 200 are filled with the repair means due to capillary effects. After another predetermined period of time has elapsed, the control unit activates the pump element 300 to generate an overpressure. This overpressure is then applied by means of the pressure-tight connection between the pump element 300 and the second passage 106 of the processing head 101 between the damaged spot 201 and the repair section 103. As a result of the overpressure, the repair means is transferred or pressed into the remaining cavities or hollows of the damaged spot 201. After a further predetermined period of time has elapsed, a negative pressure is again applied to the second passage 106 by means of the control unit through the pump element 300, whereby air inclusions in the liquid repair means located in the damaged spot are eliminated. The control unit simultaneously re-establishes a pressure-tight connection between the first pressure connection 109 and the pump element 300 by means of the switching element 111, so that a negative pressure can again be applied to the first passage 106. Alternatively, the pressure-tight connection between the first pressure connection 109 and the pump element 300 may continue to be interrupted as the back-pressure valve 113 may be configured to maintain a negative pressure throughout the repair process.

The control unit is furthermore configured to alternately change the applied pressure profile at the second passage 106 over a predetermined period of time. Such a continuous alternating application of different pressure values or pressure processes to the damaged spot 201 ensures that any cavities or hollows in the damaged spot 201 are filled with repair means. As a result, the quality of the repaired damaged spot 201 is considerably improved even if only one pump element 300 is used.

After the predetermined duration has elapsed, the control unit stops pressurizing the first passage 104 and the second passage 106.

Figure 5:
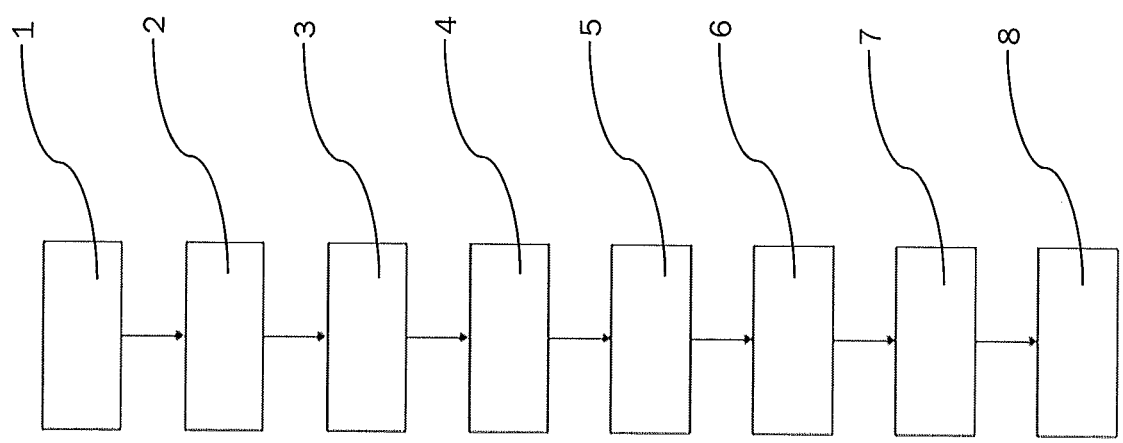
FIG. 5 shows a flow chart explaining the method steps for repairing a damaged spot on a glass pane or another surface.

FIG. 5 shows a flow chart showing an example of method steps for repairing a damaged spot 201 of a glass pane 200.

In step 1, a first input is recorded by the control unit. In response to this input, the control unit activates the device for repairing a damaged spot 201 of a glass pane 200.

In step 2, a processing head 101 is arranged at or above the damaged spot 201 of the glass pane 200.

In step 3, a second input is recorded by the control unit, initiating an automation process. This automation process initiates the repair of the damaged spot 201.

By means of the control unit, a pump element 300 is instructed to generate a negative pressure. As shown for example in FIG. 1, this negative pressure is applied by means of a pressure-tight connection between the pump element 300 and the second passage 104 of the processing head 101 between the glass pane 200 and the fixing section 102, whereby the processing head 101 is fixed to the glass pane due to a pressure gradient between the atmospheric pressure surrounding the processing head 101 and the applied negative pressure (step 4).

During application of the negative pressure, a repair means is brought into the second passage 106 of the processing head. After applying the negative pressure at the damaged spot 201 for a predetermined period of time, a normal pressure (atmospheric pressure) is applied at the damaged spot 201. The liquid repair means flows, for example under the influence of the gravity field, to the damaged spot 201 (step 5).

By means of the control unit, one or more pump elements are then used to apply an at least partially alternating pressure curve over a predetermined period of time between the damaged spot 201 and the repair section 103 of the processing head 101 (step 6).

After the predetermined duration has elapsed, the pressurization is stopped by causing the control unit, the processing head 101 is removed from the glass pane 200 and the damaged spot 201 filled with repair means is irradiated with light from a light source, thereby causing or accelerating curing of the liquid repair means (step 7).

Subsequently, the damaged spot 201 is further processed. In particular, by means of a combination of the processes of grinding, cleaning, waxing and polishing, the repaired damaged spot 201 is adapted to the surface structure of the undamaged areas of the glass pane 200 (step 8).

As a result, normal use of the glass pane is possible, avoiding complete replacement of the damaged glass pane and thus avoiding costs.

Figure 6:
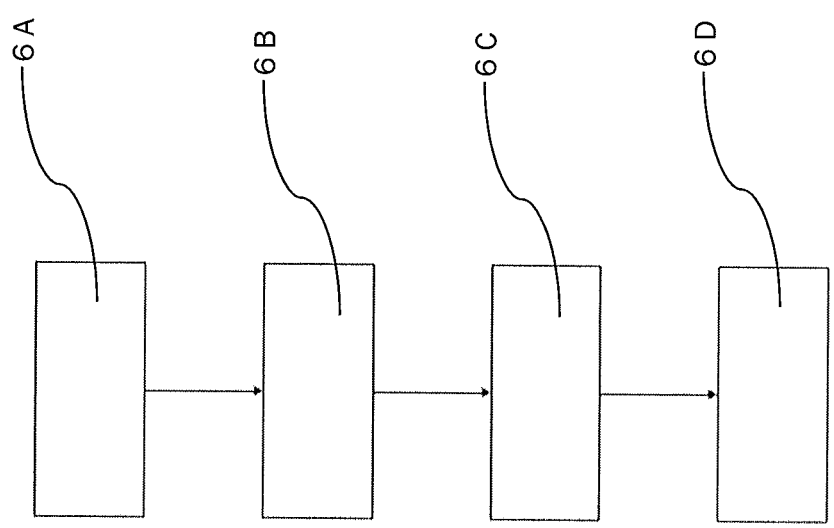
FIG. 6 shows a flow chart explaining in detail the method steps with regard to the pressurization during the repair period.

FIG. 6 shows a flow chart which explains the process steps in particular with regard to the pressurization during the repair period in more detail.

In particular, in step 6A, a negative pressure is applied over an initial time interval between the damaged spot 201 and the repair section 103 of the processing head 101. This negative pressure allows the damaged spot to be cleaned of impurities such as dust particles.

During a second time interval, an atmospheric normal pressure is applied between the damaged spot 201 and the repair section 103 of the processing head 101.

During the first and second time intervals, the liquid repair means is introduced into existing cavities and cracks of the damaged spot 201, e.g. by capillarity (step 6B).

Subsequently, an overpressure is applied during a third time interval between the damaged spot 201 and the repair section 103. This overpressure forces the liquid repair means into the remaining cavities of the damaged spot and fills them up (step 6C).

In process step 6D, the second passage 106, and thus also the volume between the damaged spot 201 and the repair section 103, is then periodically alternately applied with a negative pressure, atmospheric normal pressure, and an overpressure until the end of a predetermined period. In other words, the damaged spot and the liquid repair means contained therein are applied with periodically changing pressure values over the predetermined period of time, which considerably increases the quality of the repair of the damaged spot, since in particular air inclusions in the damaged spot 201 filled with repair means are eliminated or avoided.

Figure 7A:
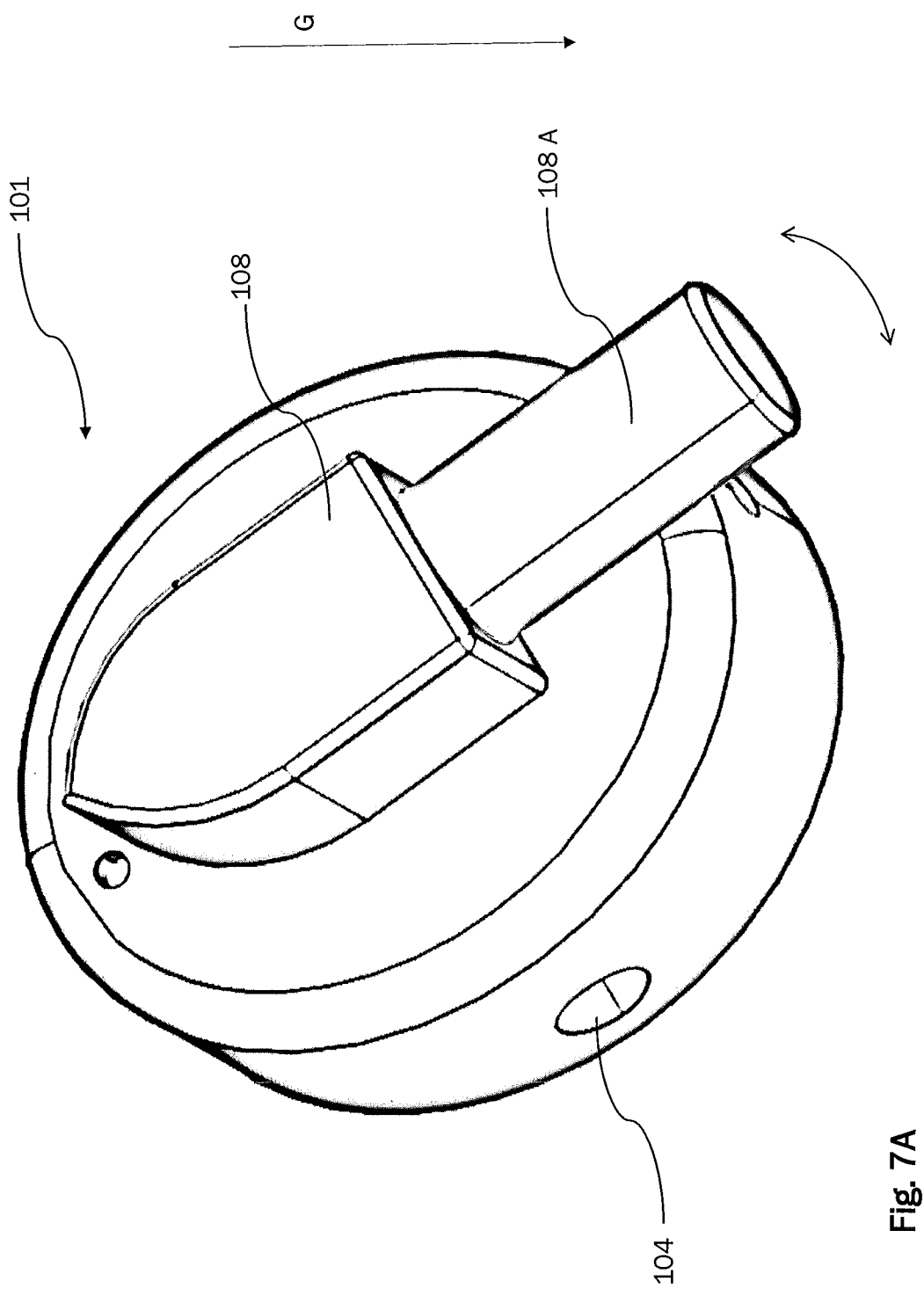
FIG. 7A shows a processing head having a rotary element which includes the liquid repair means in a perspective view from above.

FIG. 7A shows a top view of the processing head with a rotatable rotary element pin configuration comprising the liquid repair means.

The perspective shown in FIG. 7A shows a view of the processing head 101 in the direction of a damaged spot of a glass pane.

In particular, in the top view of the processing head 101 shown in FIG. 7A, the first passage 104 is visible on a wall section of the processing head. Further, a rotary element 108 is shown having a chamber (not shown) disposed on the processing head 101 and being further rotatable relative to the processing head 101. Furthermore, FIG. 7A shows a pin 108 A configured to be inserted into an opening in the chamber or threaded into the chamber. The pin 108 A is also configured to contain the repair means. For example, the pin 108 A may comprise a cartridge or capsule containing the repair means, or the repair fluid or liquid repair means may be introduced directly into a cavity of the pin 108 A. The chamber is connected by a third passage (not shown) to the processing point 500. Here, the third passage can lead into the second passage 106.

In particular, the rotary element 108 comprises a tubular projection forming a 90° angle with the rotary element 108 and extending from the rotary element 108 into the processing head 101 (not shown). The tubular projection of the rotary element 108 inserted into the processing head 101 is furthermore surrounded by sealing elements.

The tubular projection comprises, in particular, a passage which at one end leads into the processing head and opens at the opposite end into the chamber of the rotary element 108.

As a result, the third passage is formed by means of the tubular projection of the rotary element 108, by means of which the repair fluid can be transferred from the chamber to the damaged spot.

In the situation regarding the processing head shown in FIG. 7A, the rotary element 108 with chamber is arranged in a position where the repair fluid cannot flow from the pin 108 A into the chamber and through the third passage to the second opening 107 and into or onto the processing point 500.

In particular, in the arrangement shown in FIG. 7A, the rotary element 108 with chamber and the pin 108 A inserted therein are in a position in which the repair fluid cannot flow onto the repair section because gravity retains the repair fluid in the pin 108 A or the chamber, respectively, so that the liquid repair means cannot enter the third passage (for clarification, it should be noted that the gravity in FIG. 7A acts in the direction of vector G).

By rotating the rotary element 108 with the chamber to a flow position which, for example, can be achieved by applying a torque to the pin 108 A or the rotary element 108 with the chamber, the repair fluid is allowed to flow under the influence of gravity to the repair section and thus to the processing point 500. More precisely, under the influence of gravity, the liquid repair means can flow from the pin 108 A or the chamber into the third passage of the processing head 101 and thus reach the damaged spot 201.

For example, a passage position corresponds to an arrangement of the rotating element 108 with chamber and the pin 108 A in which the rotary element 108 and the pin 108 A are rotated by approx. 180° from the configuration shown in FIG. 7A. Thus, the rotary element 108 with chamber and the pin 108 A represent a lever arrangement or a lever in which the repair fluid can be transferred to the repair section by rotating the lever.

Figure 7B:
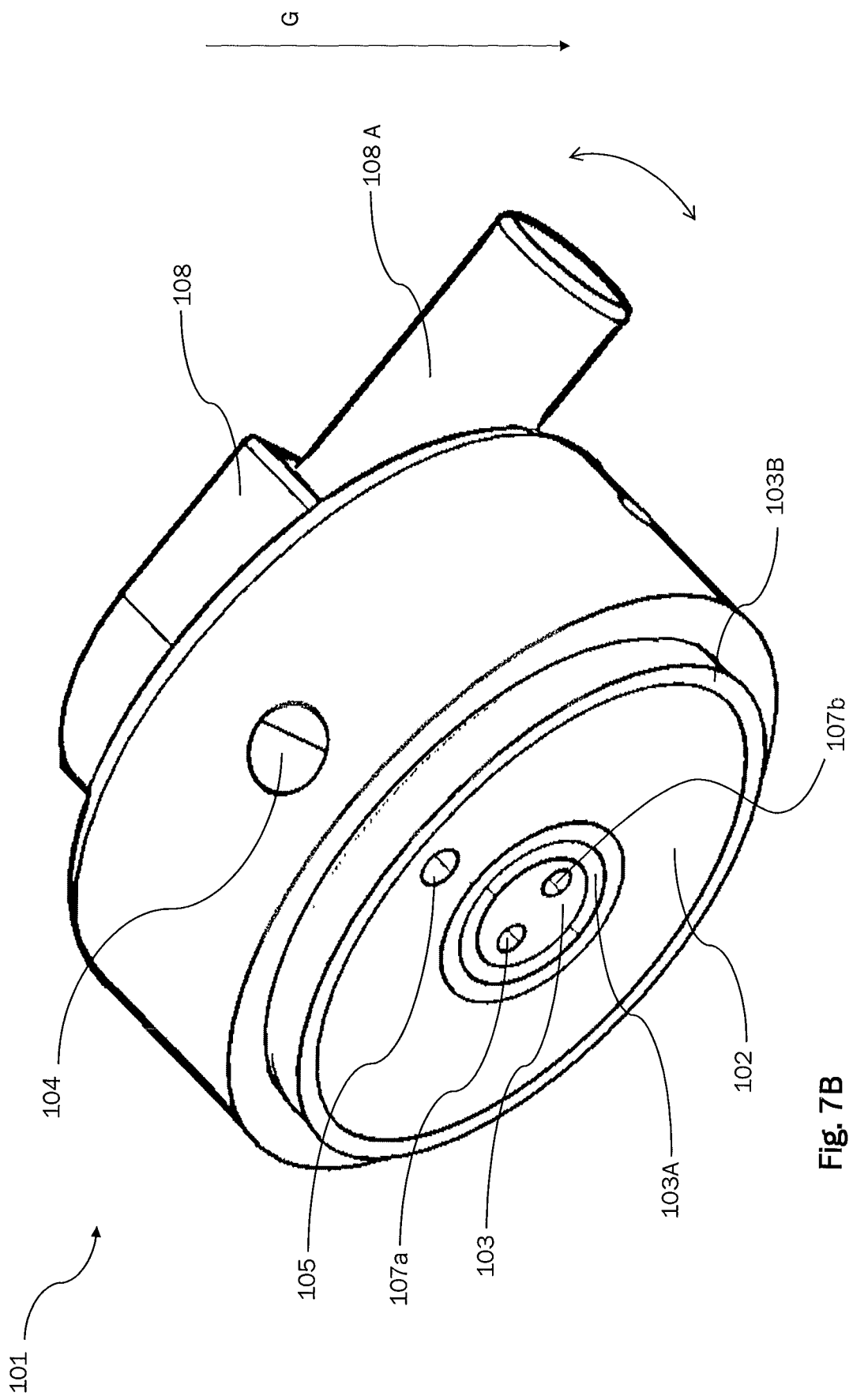
FIG. 7B shows a processing head having a rotary element which includes the liquid repair means in a perspective view from below.

FIG. 7B shows a bottom view of the processing head 101 with a rotatable rotary element-pin configuration comprising the liquid repair means.

In the perspective shown in FIG. 7B, the processing head 101 is shown with the fixing section 102, the repair section 103, the first elastic sealing element 103 A, the second elastic sealing element 103 B, the first and second openings 105, 107, and the first passage 104. In addition, the rotary element 108 with chamber, which is rotatably arranged on the processing head 101, and the pin 108 A which is inserted or introduced into the chamber, are shown, which in their unit represent a rotary lever. As already explained above, the processing head 101 is arranged on the damaged spot 201 of a glass pane 200. To be more precise, the repair section 103 of the processing head 101 is mounted on a damaged glass pane 200 in such a way that the damaged spot 201 and the repair section 103 overlap.

The pin 108 A inserted into the chamber may contain the repair fluid. However, in the position of the rotary element with chamber and pin 108 A shown in FIG. 7B, the repair fluid cannot be conducted from the chamber to the repair section 103 under the influence of gravity, but, in the configuration shown in FIG. 7B, is retained in the pin 108 A by the gravity (the direction of gravity is indicated by the vector G in FIG. 7B).

By means of rotation of the lever arrangement (rotary element 108 with chamber and pin 108 A) to a passage position, i.e. rotation of the lever by 180° from the arrangement shown in FIG. 7B, the repair fluid is passed at least through the lower second opening 107b and/or through the lower second opening 107b and the upper second opening 107a to a damaged spot 201 of the glass pane 200 by means of the third passage (not shown) connecting the chamber to the repair section 103.

As a result, by means of a rotary movement of the lever (the unit consisting of rotary element 108 with chamber and pin 108 A) to a passage position or, for example, upwards, the repair fluid is brought under the influence of gravity to the damaged spot 201.

By providing the second two openings 107a and 107b, it can be ensured that the repair fluid can be almost completely transferred to the damaged spot 201. This results from the fact that, for example, the second opening 107b at the bottom ensures that almost all the repair fluid can flow out of the processing head 101 and onto the damaged spot 201. At the same time, it is guaranteed that air can be sucked out or overpressure can be applied through the second opening 107a further above in the further cycles or processing steps. By the provision of the two second openings 107a and 107b, a problem-free repair is also possible for very flat discs (e.g. 35°).

It should be expressly noted at this point that the two second openings 107a and 107b depicted and described in this Figure can be used for all embodiment.

It should furthermore be noted that of course openings other than those shown can also be provided, i.e. instead of the circular openings, appropriate slots or similar could be used, depending on the application purpose. In addition, the embodiment shown should not be limited to only two second openings, thus, the use of more than two second openings could also be useful.

In addition, it should be pointed out at this point that the use of a second additional negative pressure ring is also conceivable. An inner second elastic sealing element and an outer second elastic sealing element would thereby be used. Within each ring then formed, an outer fixing section and an inner fixing section, an outer first opening and an inner second opening, respectively, would be provided to apply a corresponding negative pressure in each of said fixing sections. These first openings (the inner first opening and the outer first opening) would then each be connected to the first pump element 300 to create a negative pressure.

By providing a second negative pressure ring, a further optimization can be realized in such a way that even stronger curved discs or stronger curved sections of discs can be repaired without the risk of loosening the processing head 101 during processing.

Further, the processing head 101 may be configured such that the back-pressure valve 113 is included by the processing head 101 so as to allow fixing of the processing head 101 to a glass pane to be repaired without requiring continuous pressurization (negative pressure) by the first pump element 300 over the duration of the repair process.

According to the invention, a repair cycle basically consists of three pressure states. State negative pressure, state atmospheric pressure, and state overpressure. The sequence of states in the repair cycle can basically be configured as follows: negative pressure-atmospheric pressure-overpressure-negative pressure-atmospheric pressure-overpressure-negative pressure etc.

The first pump element 300 can continuously provide negative pressure during the repair process (i.e. the pump in question runs continuously and produces negative pressure, for example).

Figure 8:
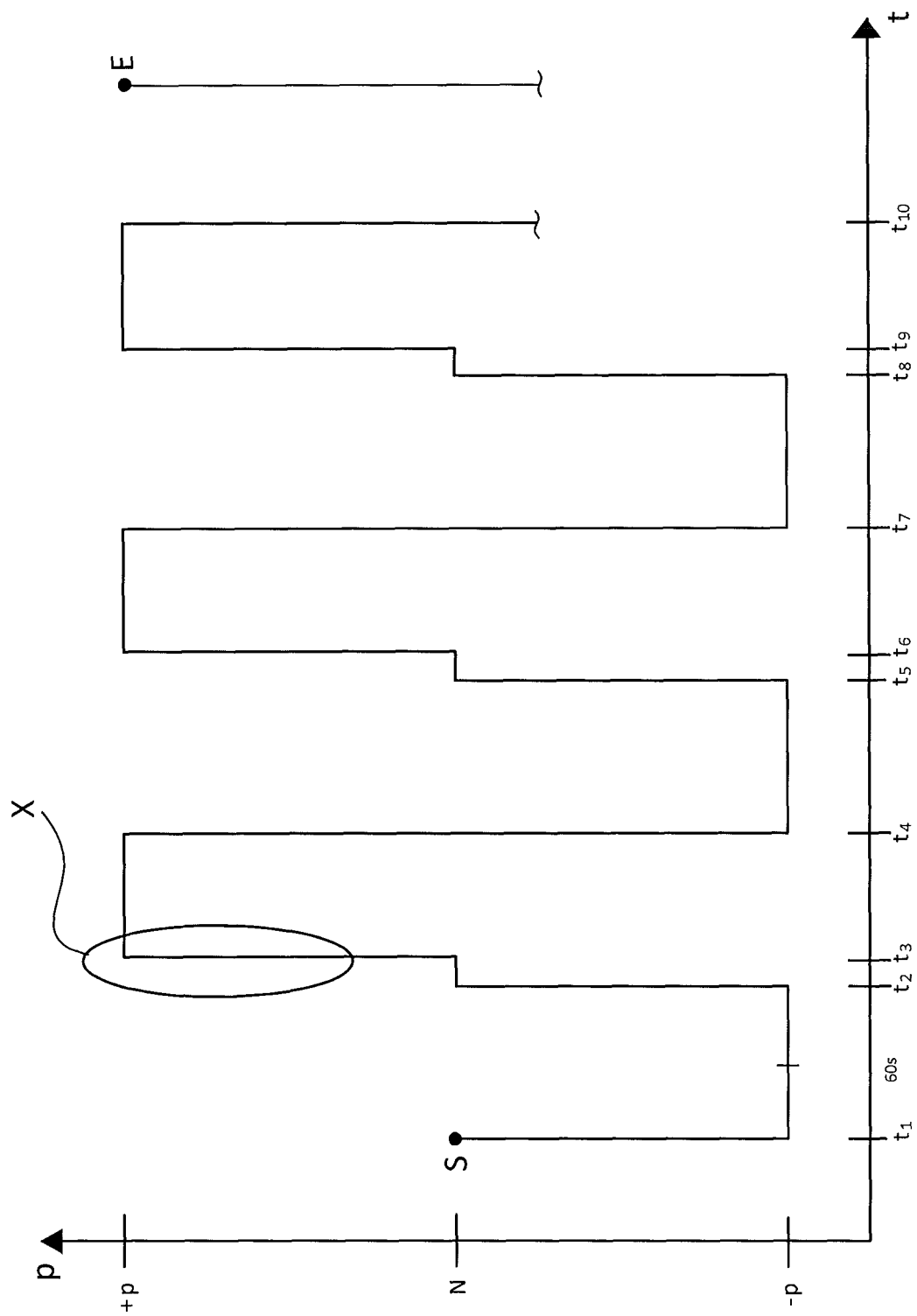
FIG. 8 shows a pressure curve at a processing point.

FIG. 8 exemplarily shows a pressure curve at a processing point 500 (see FIG. 2). The pressure is indicated on the ordinate and the time on the abscissa. On the ordinate +p means an overpressure, N atmospheric pressure (or normal pressure) and −p negative pressure. After starting the system at point S at time $t_1$, a negative pressure is applied to the processing point 500. This can be done by connecting the already running first pump element 300 to the repair section 103 via the switching element 111. The negative pressure is applied very quickly or abruptly, since the first pump element 300 is already running and the time for applying the negative pressure only depends, for example, on the switching time of the switching element 111, wherein the switching time of the switching element 111 is very short and, for example, amounts to 0.1 to 0.5 s. During this period, the pressure drops from normal pressure to negative pressure. The negative pressure is maintained between $t_1$ and $t_2$. For example, this time can be 60 seconds. The system is then reset to normal pressure. The switching element 111 can interrupt the connection to the first pump element 300. The normal pressure is then maintained between time $t_2$ and $t_3$. This period can be 10 seconds, for example. Then the switching element 111 can interrupt the connection to the first pump element 300 and the second pump element 400 can be started up to generate an overpressure, wherein a connection to the second pump element 400 is established substantially simultaneously by the switching element 111. Between time $t_3$ and $t_4$, this overpressure is maintained for a period of 60 seconds, for example. Then the switching element 111 is actuated at time $t_4$ such that a connection is again established with the first pump element 300 which is permanently running. As a result, the pressure at the processed point abruptly changes from an overpressure +p to a negative pressure −p. This can be maintained for the period $t_4$ to $t_5$. The pressure drops from overpressure to negative pressure in a very short period of time. The period is, for example, in the range of 0.1 to 0.5 s. After applying the negative pressure or essentially at the same time (time $t_4$), the second pump element 400 can be switched off or shut down again. The negative pressure is maintained between $t_4$ and $t_5$. For example, this time can be 60 seconds. The system is then reset to normal pressure. The switching element 111 can interrupt the connection to the first pump element 300. Thereafter the normal pressure shall be maintained between time $t_5$ and $t_6$. This period can be 10 seconds, for example. At time $t_6$, the switching element 111 is again switched for a connection to the second pump element 400 and the second pump element 400 is activated so that at time $t_6$, an overpressure is again applied. Depending on the repair process, such overpressure/negative pressure cycles are repeated with a predetermined frequency or number until the repair process comes to an end at point E.

FIG. 9 schematically shows a magnified section of a pressure increase process marked X in FIG. 8. FIG. 9 shows that the increase in pressure, although schematically shown in FIG. 8 as gradual, increases gently and evenly. For example, the time that elapses between $t_3$ or the time of a connection with the second pump element 400 and reaching +p can be 5 to 60s. Furthermore, the system can be configured such that a slightly higher overpressure is set each time there is a change from negative pressure to overpressure, for example a pressure $p_1$ at the first start-up, then $p_2$ and finally the maximum pressure $p_n$. At this point it should be noted that the maximum pressure $p_n$ can be set with high precision by means of the pressure relief valve 112. Possible pressures would be for example for $p_1$ 3.85*10$^5$ Pa, $p_2$ 3.90*10$^5$ Pa, and $p_n$ 4.00*10$^5$ Pa.

For example, after the second pump element 400 has started up, the following pressures can be reached depending on the time:
after 6s→2*10$^5$ Pa
after 9s→3*10$^5$ Pa
after 1 s→3.5*10$^5$ Pa
after 17s→3.8*10$^5$ Pa
after 30s→3.83*10$^5$ Pa
after 60s→3.85*10$^5$ Pa In this case, the gradient (pressure rise gradient) of the curve would decrease from initially 0.3 [10$^5$ Pa/s] to 0.25, then 0.05 and to the final pressure (in this case $p_1$) to 0.001: The last pressure value, for example, would correspond to $p_1$ shortly before or at $t_4$. In the next cycle, for example, a pressure of 3.90*10$^5$ Pa would be applied ($p_2$ shortly before or at $t_7$). In the next cycle, for example, a pressure of 4.0*10$^5$ Pa would be applied ($p_n$ shortly before or at $t_{10}$). It should also be noted that the start-up of the second pump element 400 at the points in time $t_3$, $t_6$, . . . in the initial phase results in a very gentle increase of the pressure, wherein the pressure increase gradient from 0 to the aforementioned e.g. 0.3 increases gently and uniformly. This gentle or uniform increase also contributes to the optimal repair result.

As already mentioned above, the permanent operation of the first pump element 300 provides a constant negative pressure. Depending on the switching of the corresponding switching elements, for example, at time $t_1$, $t_4$, $t_7$ it is possible to switch abruptly from overpressure to negative pressure or to apply a negative pressure abruptly at the processing point 500 so that any air remaining in the damaged spot can be abruptly torn away and, for example, sucked off via the upper hole (second opening 107a).

As already mentioned above for the description of FIG. 7b, the provision of the second two openings 107a and 107b can ensure that even if the system is 50% overfilled with repair resin and the glass inclination is, for example, 35°, the upper second opening 107a can be used for completely barrier-free suction, moisture removal or the like, if the negative pressure cycle is present or negative pressure is applied.

During the presence of negative pressure, the repair fluid can be introduced and flow onto the damaged spot. Due to the negative pressure, this can be sucked in by the damaged spot, so to speak. After generating the negative pressure and introducing the repair fluid, the atmospheric state (normal pressure) is first set as shown in FIG. 8. As a result, the repair fluid can flow into the damaged spot completely free of pressure and turbulence (this time is between $t_2$ and $t_3$, for example).

This completely avoids overpressure suddenly acting on the repair area and a gentle, partial filling of the damage can take place. Furthermore, air in the damaged spot can move out of the damaged spot free of pressure and turbulence. Any air bubbles that may be present can thus rise very effectively to the upper edge of the repair section and move into the extracted air stream.

After the gentle, depressurized partial filling of the damage, the overpressure cycle starts. The second pump element 400 which is only starting now, generates a slowly increasing overpressure above the repair section (see, for example, FIG. 9). This slow increase is controlled by a high-precision pressure relief valve 112 which can be configured as a bypass valve at the outlet on the pressure side so that no pressure shock occurs. When the second pump element 400 has reached full capacity and the pressure relief valve 112 has reached its maximum flow capacity, the full repair pressure $p_n$ is available. This process enables complete or almost complete gentle filling. This construction allows a "gentle" repair pressure of, for example, approx. $4*10^5$ Pa to be achieved, which was previously regarded as technically almost impossible to repair, for example, stone chips, without overfilling them. This means that even larger stone chips with considerable cracking can be filled, where customary stone chip repair systems have long since reached their limits.

After the overpressure phase, it suddenly goes to the negative pressure phase (e.g. at time $t_4$). Within less than 0.2 seconds, for example, $-0.85*10^5$ Pa (relative to normal pressure) can be achieved. This corresponds to an absolute pressure difference above the damaged spot of approx. 4.85*105 Pa in a fraction of a second. Any remaining air inclusions in the damaged spot are torn away and sucked away through the upper second opening 107a, for example. This means that damage, if necessary, can be degassed during each negative pressure cycle.

Furthermore, it should be noted that after the partial filling of the damage with repair resin without pressure, the subsequent cycles can achieve a filling of the damaged spot, or essentially almost complete filling, without tearing open the damaged spot further, whereby very good repair results can be achieved.

It should also be further noted that in the very unlikely event that a power or pump failure results in a negative pressure loss, the back-pressure valve 113 ensures that the processing head is disconnected for at least 15 minutes.

By monitoring the negative pressure, by the construction of the repair head in such a way that there are no moving parts which could cause a negative pressure loss in the fixing section 102 during the repair process and by the fact that the back-pressure valve 113 is provided which ensures a detachment of the processing head for at least 15 minutes, a very high operational safety can be ensured.

Furthermore, by using a pure overpressure pump, that is the second pump element 400, it is possible to form a pressure relief valve 112 as a bypass valve without having to consider a negative pressure generating function of this pump. Excessive pressure is discharged through the pressure relief valve 112 so that a constant, controlled and ideally adjusted overpressure is always available. It can also be advantageous to permanently generate a slightly too high pressure by the second pump element 400, wherein this slightly too high pressure is then lowered to the ideal pressure by the pressure relief valve 112. Therefore any voltage fluctuations of the power supply can be compensated as far as possible and an optimal repair result can be achieved at any time.

Furthermore, the ideal overpressure can be monitored via a pressure sensor, for example, wherein an alarm message can be generated, if the pressure falls below or exceeds the ideal pressure.

In addition, the cyclic start-up of the second pump element 400 (see, for example, times $t_3$, $t_6$, etc.) can halve the wear with regard to overpressure generation, since the pump is only put into operation when overpressure is required. Therefore, the pump will be more durable and will be able to generate the correct overpressure needed to fully fill the damage over a longer period of time.

By cyclically switching the second pump element 400 on and off, the repair section of the processing head is, as already explained above, not suddenly applied with overpressure, but gently to a predetermined gradient, both the start-up (booting) and the attainment of the respective overpressure ($p_1$, $p_2$, $p_n$) can be realized with a uniform or sinking gradient (see FIG. 9). The repair result can be strongly optimized and, in particular, the risk of further tearing during the repair of the damaged spot can be strongly minimized by the gentle start-up and gentle driving into the respective cycle overpressure ($p_1$, $p_2$, $p_n$).

Due to this slowly increasing repair overpressure, any small air accumulations still present in the upper part of the repair section cannot be swirled with the repair fluid and thus not pressed into the damaged spot. This also has a positive influence on the technical and optical quality of the repair.

It should be expressly mentioned at this point that the pressures $p_1$, $p_2$, $p_n$ shown in FIG. 9 can of course also be the same from cycle to cycle, i.e. the pressure $p_n$ can also be set during the first start-up of the second pump element 400 (the pressures $p_1$, $p_2$, etc. would then not be started). Due to the aforementioned gentle increase of the initial phase and the further gentle driving into the respective maximum pressure, a very good result can be achieved for each overpressure cycle even with only one predetermined maximum pressure. This very good result can be further optimized, if desired and necessary, by a gradual start-up at the respective maximum pressure.

The above mentioned embodiments and examples can be arbitrarily combined with one another.

In summary, it can be established that the present invention strongly facilitates the repair process and significantly increases the quality of the end product. Thus, the grade of the repaired damaged spot is strongly improved. In many cases it can thus be avoided that a glass pane has to be completely replaced, which saves costs.

The invention claimed is:

1. A device for repairing a damaged spot of a glass pane, the device comprising:
 a processing head configured to be arranged on the glass pane, the processing head including:
  a fixing section configured to fix the processing head to the glass pane for a duration of the repair;
  a repair section configured to fill the damaged spot with a repair means;
  a first passage having a first opening which leads into the fixing section and which is configured to be applied with a negative pressure, wherein by means of the first opening, the negative pressure is applied between the glass pane and the fixing section;
  a second passage having a second opening which leads into the repair section and which is configured to be applied with an alternating pressure profile for a predetermined duration, wherein by means of the second opening the alternating pressure profile is applied between the damaged spot and the repair section;
  wherein the processing head is configured to introduce the repair means into the second passage, apply the repair means to the damaged spot, and enable the damaged spot to be filled with the repair means; and
 a control unit configured to apply the alternating pressure profile during the duration of the repair, wherein the alternating pressure profile includes a plurality of pressure sequences, each pressure sequence including a negative pressure −p, a normal pressure N, and an overpressure +p.

2. The device of claim 1 wherein the negative pressure −p has a value between −0.5 and −0.95*105 Pa.

3. The device of claim 1 wherein the negative pressure −p has a value between −0.70 and −0.85*105 Pa.

4. The device of claim 1 wherein the overpressure has a value between 3.2 and 4.2*105 Pa.

5. The device of claim 1 wherein the overpressure has a value between 3.5 and 4.0*105 Pa.

6. The device of claim 1 wherein the device comprises a control unit which, in response to activation of the control unit, is configured to continuously apply the negative pressure −p to the first passage and automatically apply the alternating pressure curve to the second passage from the start of the predetermined duration until the end of the predetermined duration.

7. The device of claim 1 wherein the negative pressure −p is generated by a continuously running first pump element and the overpressure +p is generated by a discontinuously running second pump element.

8. The device of claim 7, wherein the second pump element for generating the overpressure +p is started up simultaneously with the establishment of a connection of the second opening with the second pump element and is switched off again after completion of a predetermined overpressure phase and separated from the second opening.

9. The device of claim 8 wherein after completion of the predetermined overpressure phase the overpressure phase is switched directly to a negative pressure phase, wherein the second opening at this time is connected to the continuously running first pump element.

10. The device of claim 8 wherein the pressure is increased by the second pump element gradually and uniformly and then, close to reaching a target overpressure with a decreasing, ascending gradient.

11. The device of claim 1 wherein
 the fixing section comprises a first sealing element and is separated from the repair section by means of the first sealing element, wherein the first sealing element is further configured to adapt to a curve of the glass pane when arranged on the glass pane, and
 the fixing section has a second sealing element and is separated from an outer region by means of the second sealing element, wherein the second sealing element is further configured to adapt to a curve of the glass pane when arranged on the glass pane.

12. The device of claim 1 wherein the processing head comprises a rotary element having a chamber which is rotatably arranged opposite the processing head and which comprises liquid repair means, wherein an introduction of the liquid repair means into the repair section is carried out by means of a rotational movement of the rotary element relative to the processing head.

13. The device of claim 1 wherein the liquid repair means comprises at least one of an acrylic resin, a polyester resin, an epoxy resin or a UV-curing one-component adhesive.

14. A method for repairing a damaged spot of a glass pane, the method comprising:
 arranging a processing head above the damaged spot of the glass pane;
 recording an input by a control unit and performing the following steps:
 applying a negative pressure −p between the glass pane and a fixing section of the processing head, whereby the processing head is fixed to the glass pane for a duration of the repair;
 introducing a liquid repair means into the second passage and bringing the liquid repair means onto the damaged spot of the glass pane;
 using the control unit to apply an alternating pressure profile between the damaged spot and a repair section of the processing head for a predetermined duration during the duration of the repair, wherein the alternating pressure profile includes a plurality of pressure sequences, each pressure sequence including a negative pressure −p, a normal pressure N, and an overpressure +p.

15. The method of claim 14, further comprising:
 (a) applying a negative pressure −p between the glass pane and a repair section of the processing head and thus to the damaged spot,
 (b) introducing the liquid repair means into the second passage;
 (c) applying a normal pressure N between the glass pane and a repair section of the processing head and thus to the damaged spot,
 (d) applying an overpressure +p between the glass pane and the repair section of the processing head and thus to the damaged spot;
 (e) applying a negative pressure −p between the glass pane and the repair section of the processing head and thus to the damaged spot,
 (f) applying a normal pressure N between the glass pane and a repair section of the processing head and thus to the damaged spot,
 (g) repeating steps (d) to (f) for a predetermined period of time.

16. The method of claim 14, further comprising:
 removing the processing head from the glass pane after the predetermined duration has elapsed; and irradiating the damaged spot with light from a light source, thereby causing and/or accelerating curing of the liquid repair means.

17. A device for repairing a damaged spot of a glass pane, the device comprising:
a pump coupled to a control valve;
a processing head configured to be arranged on the glass pane, the processing head including:
a fixing section configured to fix the processing head to the glass pane for a duration of the repair,
a repair section configured to fill the damaged spot with a repair means,
a first passage coupled to the control valve and having a first opening which leads into the fixing section and which is configured to be applied with a negative pressure, wherein by means of the first opening, the negative pressure is applied between the glass pane and the fixing section,
a second passage coupled to the control valve and having a second opening which leads into the repair section, wherein the pump applies an alternating pressure profile for a predetermined duration, and wherein by means of the second opening the alternating pressure profile is applied between the damaged spot and the repair section,
wherein the processing head is configured to introduce the repair means into the second passage, apply the repair means to the damaged spot, and enable the damaged spot to be filled with the repair means; and
a control unit coupled to the pump and the control valve and configured to apply the alternating pressure profile during the duration of the repair, wherein the alternating pressure profile includes one or more pressure sequences, each pressure sequence including a negative pressure −p, a normal pressure N, and an overpressure +p.

18. The device of claim 17, further comprising a back-pressure valve coupled between the pump and the first passage.

19. The device of claim 17 wherein
the fixing section comprises a first sealing element and is separated from the repair section by means of the first sealing element, wherein the first sealing element is further configured to adapt to a curve of the glass pane when arranged on the glass pane, and
the fixing section has a second sealing element and is separated from an outer region by means of the second sealing element, wherein the second sealing element is further configured to adapt to a curve of the glass pane when arranged on the glass pane.

20. The device of claim 17 wherein the processing head comprises a rotary element having a chamber which is rotatably arranged opposite the processing head and which comprises liquid repair means, wherein an introduction of the liquid repair means into the repair section is carried out by means of a rotational movement of the rotary element relative to the processing head.

21. The device of claim 17 wherein the liquid repair means comprises at least one of an acrylic resin, a polyester resin, an epoxy resin or a UV-curing one-component adhesive.

22. A device for repairing a damaged spot of a glass pane, the device comprising:
a first pump coupled to a control valve;
a second pump coupled to the control valve;
a processing head configured to be arranged on the glass pane, the processing head including:
a fixing section configured to fix the processing head to the glass pane for a duration of the repair,
a repair section configured to fill the damaged spot with a repair means,
a first passage coupled via a back-pressure valve to the first pump, having a first opening which leads into the fixing section and which is configured to be applied with a negative pressure, wherein by means of the first opening, the first pump applies a negative pressure between the glass pane and the fixing section,
a second passage coupled to the control valve and having a second opening which leads into the repair section, wherein the control valve, the first pump, and the second pump apply an alternating pressure profile for a predetermined duration, and wherein by means of the second opening the alternating pressure profile is applied between the damaged spot and the repair section, wherein the processing head is configured to introduce the repair means into the second passage, apply the repair means to the damaged spot, and enable the damaged spot to be filled with the repair means; and
a control unit coupled to the first pump, the second pump, and the control valve and configured to apply the alternating pressure profile during the duration of the repair, wherein the alternating pressure profile includes one or more pressure sequences, each pressure sequence including a negative pressure −p, a normal pressure N, and an overpressure +p.

23. The device of claim 22, further comprising a pressure relief valve coupled between the second pump and the control valve.

24. The device of claim 22 wherein the negative pressure −p is generated by a continuously running the first pump and the overpressure +p is generated by a discontinuously running the second pump.

25. The device of claim 24 wherein the second pump for generating the overpressure +p is started up simultaneously with the establishment of a connection of the second opening with the second pump and is switched off again after completion of a predetermined overpressure phase and separated from the second opening.

26. The device of claim 25 wherein after completion of the predetermined overpressure phase the overpressure phase is switched directly to a negative pressure phase, wherein the second opening at this time is connected to the continuously running first pump.

27. The device of claim 25 wherein the pressure is increased by the second pump gradually and uniformly and then, close to reaching a target overpressure with a decreasing, ascending gradient.

28. The device of claim 22 wherein
the fixing section comprises a first sealing element and is separated from the repair section by means of the first sealing element, wherein the first sealing element is further configured to adapt to a curve of the glass pane when arranged on the glass pane, and
the fixing section has a second sealing element and is separated from an outer region by means of the second sealing element, wherein the second sealing element is further configured to adapt to a curve of the glass pane when arranged on the glass pane.

29. The device of claim 22 wherein the processing head comprises a rotary element having a chamber which is rotatably arranged opposite the processing head and which comprises liquid repair means, wherein an introduction of the liquid repair means into the repair section is carried out by means of a rotational movement of the rotary element relative to the processing head.

30. The device of claim 22 wherein the liquid repair means comprises at least one of an acrylic resin, a polyester resin, an epoxy resin or a UV-curing one-component adhesive.

* * * * *